US011995447B2

(12) United States Patent
McDonald

(10) Patent No.: US 11,995,447 B2
(45) Date of Patent: May 28, 2024

(54) QUICK PREDICTOR OVERRIDE AND UPDATE BY A BTAC

(71) Applicant: CENTAUR TECHNOLOGY, INC., Austin, TX (US)

(72) Inventor: Thomas C. McDonald, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 127 days.

(21) Appl. No.: 17/071,560

(22) Filed: Oct. 15, 2020

(65) Prior Publication Data

US 2022/0121446 A1 Apr. 21, 2022

(51) Int. Cl.
*G06F 9/38* (2018.01)

(52) U.S. Cl.
CPC .......... *G06F 9/3848* (2013.01); *G06F 9/3806* (2013.01)

(58) Field of Classification Search
CPC .............................. G06F 9/3848; G06F 9/3806
See application file for complete search history.

(56) References Cited

U.S. PATENT DOCUMENTS

| | | | | |
|---|---|---|---|---|
| 5,574,871 A * | 11/1996 | Hoyt | ...................... | G06F 9/3806 712/200 |
| 6,189,091 B1 * | 2/2001 | Col | ........................ | G06F 9/3861 712/228 |
| 2001/0056531 A1 * | 12/2001 | McFarling | ............ | G06F 9/3848 712/239 |
| 2002/0194464 A1 * | 12/2002 | Henry | ................. | G06F 9/30061 712/239 |
| 2008/0195847 A1 * | 8/2008 | Wu | ........................ | G06F 9/3863 712/216 |
| 2012/0166775 A1 * | 6/2012 | Krishnamurthy | ..... | G06F 9/3848 712/E9.045 |

(Continued)

OTHER PUBLICATIONS

Eden, Of limits and myths in branch prediction, University of Michigan, 183 pages, [retrieved from the internet on Sep. 4, 2021], retrieved from URL <tnm.engin.umich.edu/wp-content/uploads/sites/353/2017/12/nomik.pdf> (Year: 2001).*

(Continued)

*Primary Examiner* — David J. Huisman
(74) *Attorney, Agent, or Firm* — McClure, Qualey & Rodack, LLP

(57) ABSTRACT

A quick predictor override system and method for a microprocessor that enables a correction to a quick predictor, branch prediction by a branch target address cache (BTAC), and rapid update to the quick predictor. For example, the microprocessor includes a quick predictor that provides branch prediction based on a local pattern history, and a large predictor in the form of the BTAC, which provides for branch prediction using a global pattern history. Branch prediction by the BTAC is the prevailing prediction if different, for a fetched cache address, than the branch prediction by the smaller, quick predictor. Accordingly, the target and direction for conditional branches provided by the BTAC for fetching the next cache instruction are used in favor of the target and direction previously provided by the quick predictor, and the quick predictor is quickly updated with the target and direction from the BTAC during a BTAC stage.

20 Claims, 5 Drawing Sheets

(56) References Cited

U.S. PATENT DOCUMENTS

| | | | | |
|---|---|---|---|---|
| 2012/0290821 A1* | 11/2012 | Shah | .................... | G06F 9/3848 |
| | | | | 712/240 |
| 2015/0268958 A1* | 9/2015 | Al Sheikh | ............. | G06F 9/3844 |
| | | | | 712/240 |
| 2019/0317769 A1* | 10/2019 | Hu | ........................ | G06F 9/3848 |

OTHER PUBLICATIONS

Cache Review, 2005, 12 pages, [retrieved from the internet on Sep. 4, 2021], retrieved from URL <web.cse.ohio-state.edu/~crawfis.3/cse675-02/Slides/CSE675_09-Cache-II.pdf> (Year: 2005).*
Jacobson et al, Path-based next trace prediction, 1997, IEEE, Proceedings of Micro-30 Dec. 1-3, 1997, 11 pages (Year: 1997).*
Shen et al, Modern Processor Design Fundamentals of Superscalar Processors, 2005, McGraw Hill, 7 pages (Year: 2005).*

* cited by examiner

QUICK PREDICTOR OVERRIDE AND UPDATE BY A BTAC

TECHNICAL FIELD

The present invention relates in general to microprocessors, and in particular, branch prediction in microprocessors.

BACKGROUND

Microprocessors today operate using a pipelined processing scheme whereby programming instructions are broken down into steps that are carried out concurrently throughout a plurality of stages of the pipeline. Instructions typically (e.g., 10-20% of programming code) comprise branch instructions, or simply branches, which include unconditional branches (e.g., branches that are always taken) and conditional branches (e.g., taken or not taken depending on evaluation of a specified condition). It is generally not known for certain whether a conditional jump will be taken or not taken until the condition has been calculated and the conditional jump has passed the execution stage in the instruction pipeline, which may cause delays in fetching the next instruction. Branch predictors have been developed that attempt to guess at the front end of the pipeline which direction a conditional branch will go, and in doing so, improve the flow of instructions through the pipeline.

One branch predictor that is commonly used in microprocessors is referred to as a branch target address cache (BTAC). The BTAC comprises hardware logic that uses a global history pattern of past branch instruction behavior to enable a prediction of a target address for a fetched branch instruction. However, depending on the microarchitecture, branch prediction by the BTAC may still impose delays of one or more clock cycles. Thus, improvements in branch prediction are desired to improve the flow of pipelined instructions and hence the speed and efficiency of execution of the instructions in a microprocessor.

SUMMARY

In one embodiment, a microprocessor, comprising: an instruction cache comprising programming instructions at a plurality of cache addresses; a quick predictor configured to receive information associated with a first branch instruction corresponding to a first cache address of the instruction cache and, based on a match at the quick predictor, provide a first branch prediction during a first stage; and a branch target address cache (BTAC) operating according to a second set of stages subsequent to the first stage, the BTAC configured to receive the information associated with the first branch instruction and determine a second branch prediction, the BTAC configured to override the first branch prediction and update the quick predictor by writing a branch target address associated with the second branch prediction to the quick predictor at a time corresponding to the second set of stages.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1:
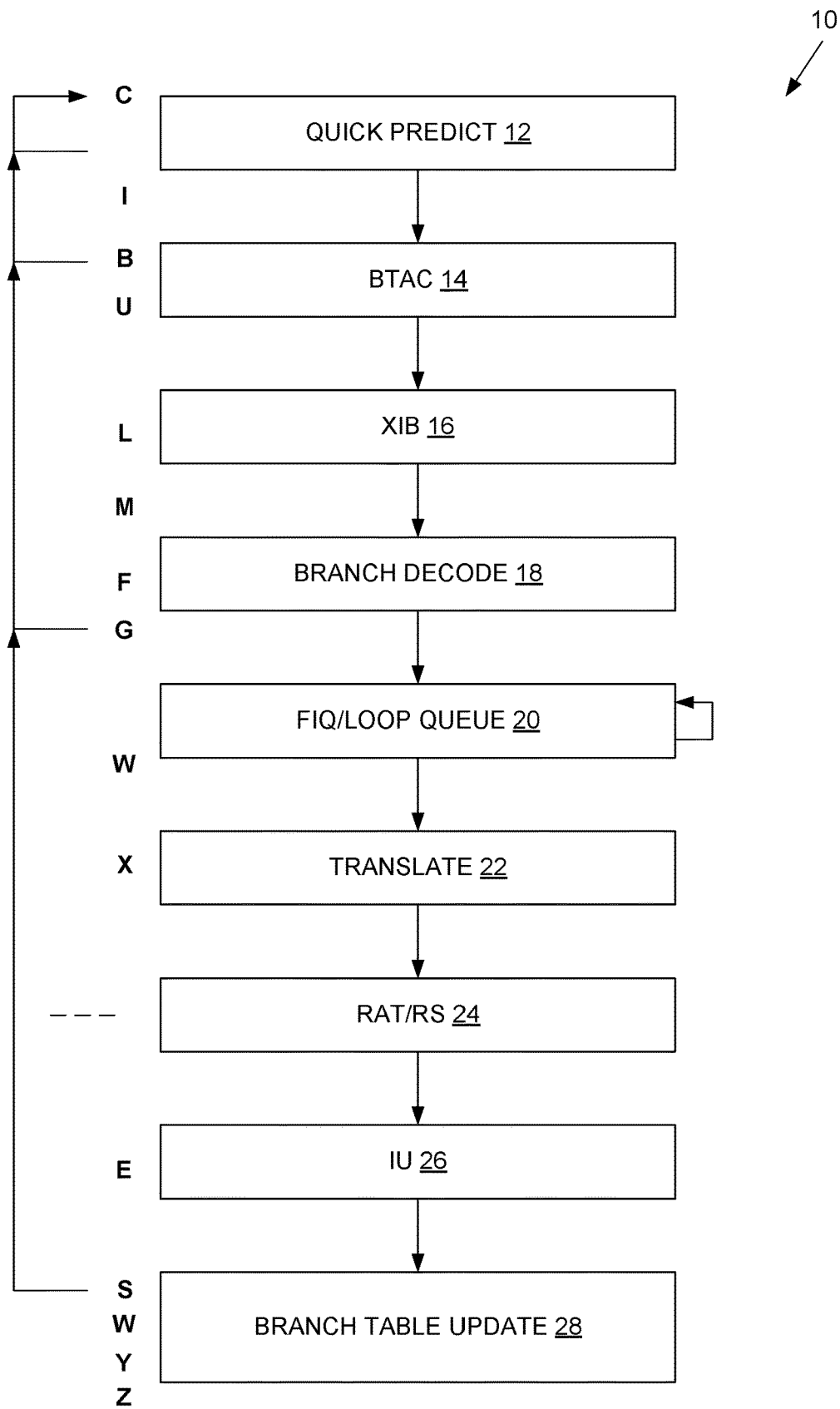
FIG. 1 is a block diagram showing an example branch unit pipeline for a microprocessor in which an embodiment of a quick predictor override system is implemented.

Certain embodiments of a quick predictor override system and method for a microprocessor are disclosed that enable a correction to a quick predictor, branch prediction by a branch target address cache (BTAC) and rapid update to the quick predictor. In one embodiment, the microprocessor comprises a front end that includes a quick predictor that provides branch prediction based on a local pattern history, and a large predictor in the form of the BTAC, which provides for branch prediction using a global pattern history. The quick predictor operates under the assumption that the branch prediction by the BTAC, if different for a fetched cache address than the branch prediction by the smaller, quick predictor, is the prevailing prediction. Accordingly, the target (e.g., target branch address of an instruction cache) and direction for conditional branches (e.g., taken, not taken) provided by the BTAC for fetching the next cache instruction is used in favor of the target and direction previously provided by the quick predictor, and the quick predictor (e.g., table) is quickly updated with the target and direction from the BTAC during a BTAC stage.

Digressing briefly, microarchitectures that rely on a BTAC for prediction may experience delays in prediction, and microarchitectures using two predictors at different stages may not enable updates to the preceding stage predictor until the execution stage or beyond. In contrast, the quick predictor of the present invention enables a single cycle branch prediction, and if mispredicted according to the BTAC, is overridden by the BTAC using a more sophisticated prediction scheme and updated during one of the operational stages of the BTAC, thus improving upon microprocessor speed and efficiency, and a reduction in delays in branch prediction.

Having summarized certain features of a quick predictor override system of the present disclosure, reference will now be made in detail to the description of a quick predictor override system as illustrated in the drawings. While a quick predictor override system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1 shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1 is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1 is merely one of many suitable architectures. The example microprocessor 10 comprises a quick predictor 12, branch target address cache (BTAC) 14, instruction byte queue (XIB) 16, branch decoder 18, format instruction queue (FIQ)/loop queue 20, instruction translator 22, register alias table (RAT)/reservation stations (RS) 24, functional units (e.g., integer unit, floating point unit, etc.) 26, and a branch table updater 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table or array (or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration. Most branches are correctly predicted by the quick predictor 12. However, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various arrays of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4k entry, m-way set-associative table or array (or target array), where m is an integer greater than one. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises a conditional relative branch predictor having a multiple entry (e.g., 12k) TAGE predictor, multiple tables, a multi-bit (e.g., 3 bit), taken/not taken (T/NT) counter, and multi-bit global branch history. As another example, the indirect prediction comprises a multiple entry (e.g., 1.5k) TAGE predictor and uses the table entries for static indirect branches. Note that in some embodiments, other types of prediction mechanisms may be used, including correlation-based prediction mechanisms. For each portion, or fetch quantum, of a cache line of the instruction cache (e.g., 16 bytes), the BTAC 14 can hold three entries (e.g., sides A, B, and C) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). Note that updates to the BTAC 14 are delayed until a branch is executed or retired, where the updates to the BTAC 14 involve writes to a BTAC table or array. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In the M (mux) stage, the XIB muxes the instructions out and delivers them to the branch decoders 18 in the F (format) stage. Further information about multi-stage branch decoders may be found in U.S. Pat. No. 8,473,862, which is incorporated by reference in its entirety.

In the F stage, the instructions are formatted. In one embodiment, the formatted instructions comprise instructions conforming substantially to the x86 architecture instruction set. Also, a determination is made at the F stage whether a given instruction was a branch or not. Where a miss occurred in the quick predictor 12 or BTAC 14 (e.g., at initial start-up), the branch decode 18 decides the current instruction is a branch, and redirects at stage G the cache address to the new target and update the arrays in the front end of the microprocessor 10. In effect, the branch decode 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). The execution units 26 also indicate whether the BTAC 14 has correctly predicted the branch instruction.

The branch table update 28 comprises stages S, W, Y, and Z, and is configured to update (e.g., at the S stage) the various arrays or tables at the front end (e.g., BTAC, indirect, TAGE) with the fully decoded and executed branch instruction (e.g., the final result of the branch). The update may involve at stages S, W Y, and Z an array read, a target address write, and a counter increment or decrement, which may involve some delays.

Figure 2A:
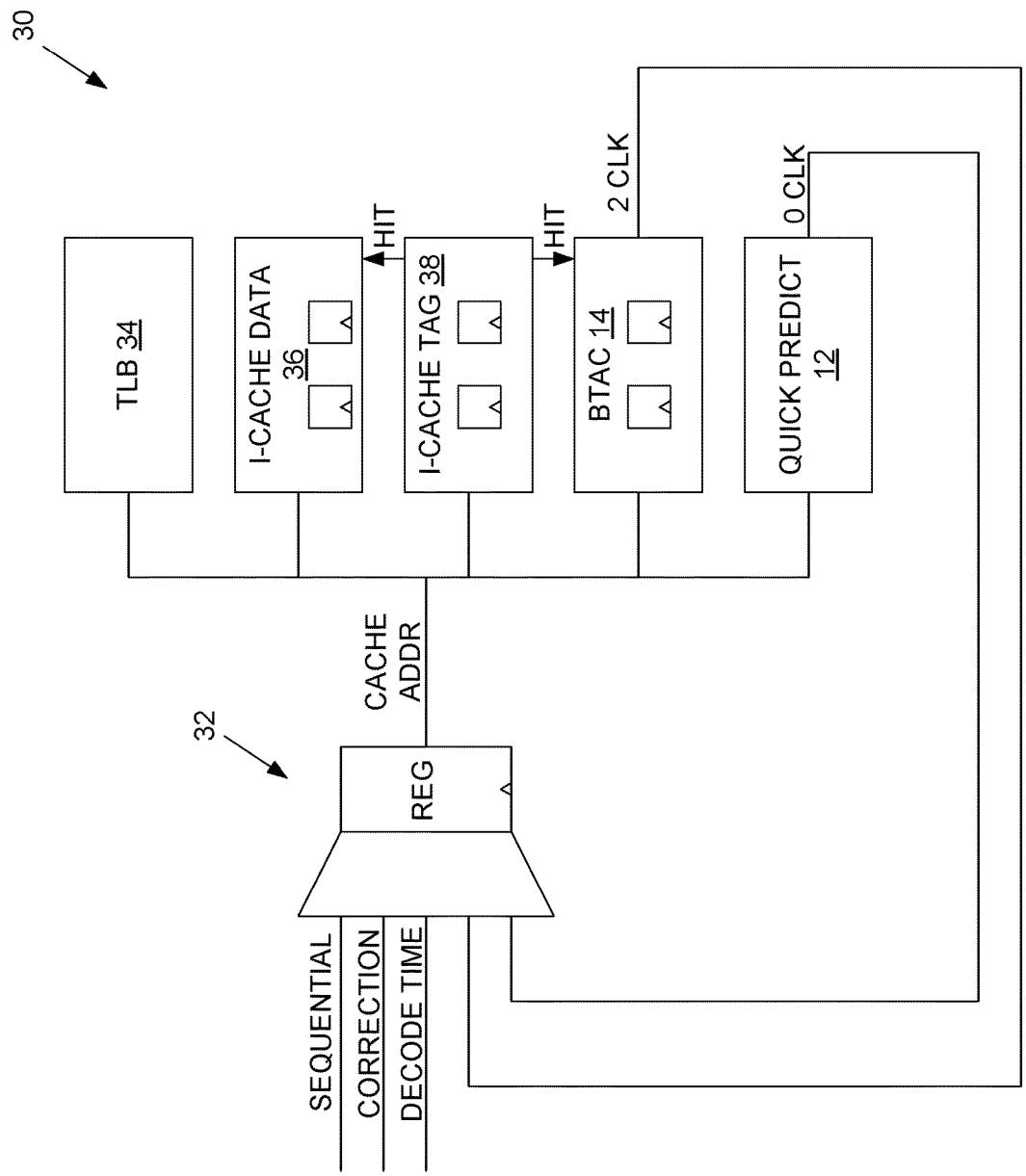
FIG. 2A is a schematic diagram showing an example quick predictor and other example cache address sources used at a front end of the branch unit pipeline shown in FIG. 1 to achieve an embodiment of a quick predictor override system.

Referring now to FIG. 2A, with continued reference to FIG. 1, shown is an example quick predictor 12 and other example sources used at a front end 30 of the branch unit pipeline shown for the microprocessor 10 of FIG. 1 to achieve an embodiment of a quick predictor override system. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB to find a match. If there is a match, the physical address is calculated from the TLB entry. If there is no match, a page table entry from memory is fetched and placed into the TLB.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0)(10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the 3rd clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty.

Figure 2B:
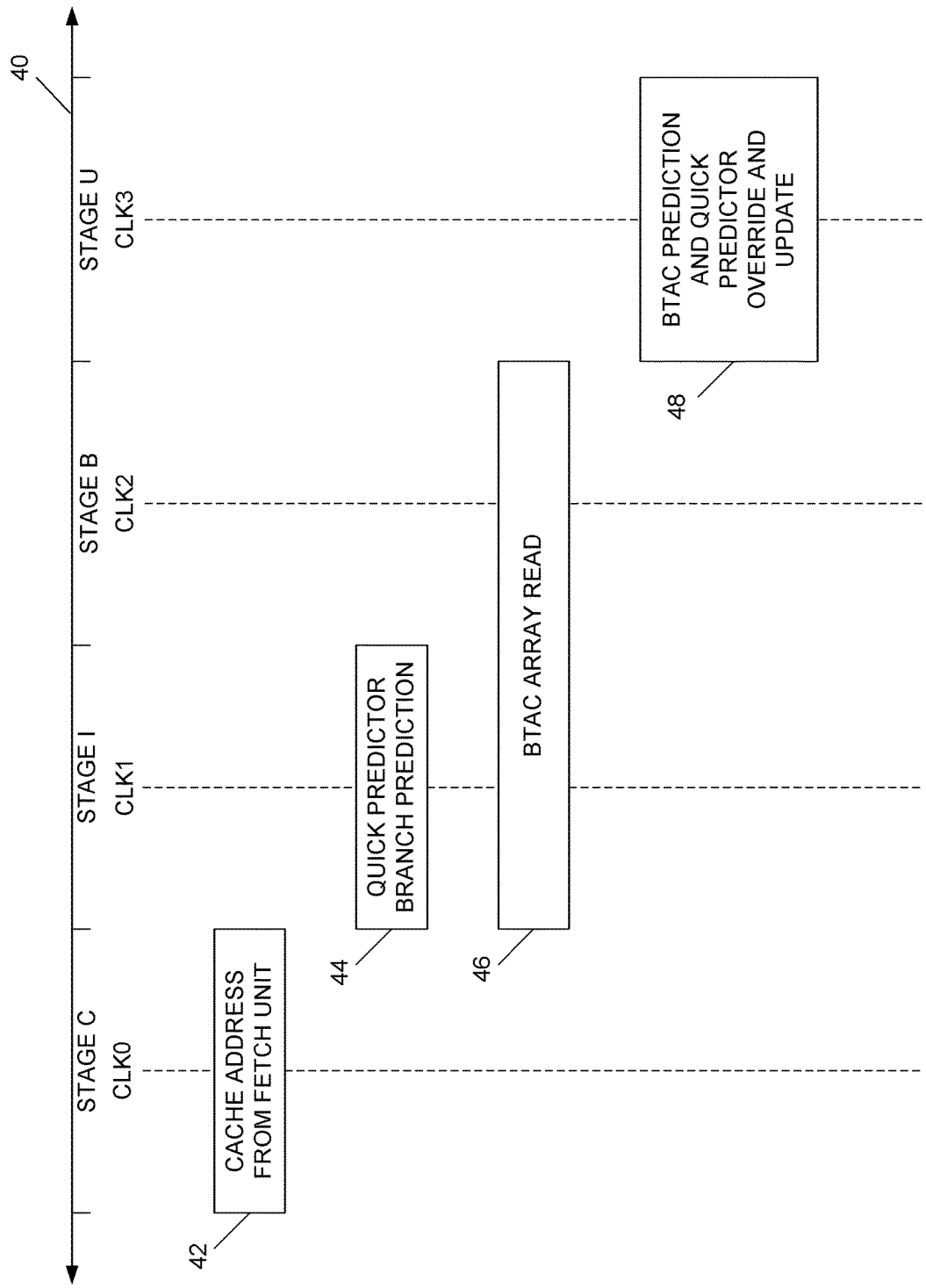
FIG. 2B is a schematic diagram that shows relative timing of one example operation of an embodiment of a quick predictor override system.

With continued reference to FIGS. 1-2A, attention is directed to FIG. 2B, which schematically illustrates the timing of one example operation of a quick predict override system. It should be appreciated by one having ordinary skill in the art that some embodiments may operate using a different timing/stage methodology, and hence is contemplated to be within the scope of the invention. A timing scale 40 (double-arrowed as to reflect a snapshot in ongoing time) is shown and includes progressively advancing clock timing (clk0, clk1, clk2, clkc3, etc.) and corresponding stages (e.g., C, I, B, U) of the front end 30. In one example operation, the fetch unit 32 outputs, at clk0, stage C, the fetch or cache address value (42) by selecting one of a plurality of addresses provided by the various sources explained above, including the next sequential fetch address (via an adder), a predicted branch target address provided by the BTAC 14, a predicted branch target address provided by the quick predictor 12, a correction target address provided by the functional (execution) unit 26, and a branch target address (decode time) provided by the branch decoder 18. Control logic, as is known, controls the fetch unit 32 to select one of the inputs to the fetch unit 32 based on, for instance, a direction prediction and type of the branch instruction predicted.

In response to the fetch or cache address output by the fetch unit 32, a hit in the I-cache tag 38 prompts access to the I-cache data 36 and the BTAC 14. At this point (I-stage, clk1), the quick predictor 12 provides a branch prediction (44) and a BTAC array read (46) is implemented over stages I and B (clk1 and clk2). In one embodiment, the quick predictor 12 determines whether there is a tag match and valid entry in the quick predictor 12 earlier than the access to the I-cache data 36 and BTAC 14. The quick predictor 12 predicts multiple branches per clock (e.g., three or more branches per clock). For instance, in an embodiment where the quick predictor 12 comprises 128 entries arranged according to 16 sets and 8-ways, the quick predictor may predict up to 8 branches per clock. Accordingly, within a single clock cycle, the quick predictor 12 reads eight (8) entries of a set and compares to the inputted cache address (e.g., output from the fetch unit 32) to determine if there is a tag match and valid entry, checks the branch type (e.g., conditional, unconditional, etc.), selects (muxes) the first branch that is valid, predicted taken (and which is an address that has not already been passed at this stage), and redirects the cache address without penalty.

The BTAC 14 may override the quick predictor 12, update the quick predictor, and provide its own prediction (48) at the U stage (clk3). In some embodiments, the update may occur at a different time proximal to the U stage (e.g., during the BTAC array read (e.g., at stage B), or after stage U but before the execution stage). As explained above, the BTAC 14 is larger than the quick predictor 12, and uses a prediction mechanism based on a global branch pattern whereas the quick predictor uses a less sophisticated local branch pattern (e.g., three bits long). In one embodiment, when there is a difference in prediction between the quick predictor 12 and the BTAC 14, the BTAC 14 always overrides the quick predictor 12, and the update occurs two cycles later (e.g., in the U stage, as opposed to updates post-execution stage). As an example operation, assume the quick predictor 12 predicts not taken, but the BTAC 14 predicts taken. The BTAC 14 changes the cache address to the target of the taken branch. If the quick predictor 12 predicts taken but the BTAC 14 predicts not taken, redirection of the cache address is to the sequential path. Though rare, the latter action may impose a penalty that may not normally arise without the quick predictor 12. To mitigate such circumstances, certain embodiments of a quick predictor system comprise a bias of the quick predictor 12 to not taken. As explained above, the quick predictor 12 comprises a conditional predictor and plural array entries comprising eight (8) 3-bit counters, where the conditional predictor is accessed in parallel with the array and provides the taken/not taken direction for conditional branches. The quick predictor 12 may bias towards not taken by requiring a certain number of predict taken determinations to provide sufficient confidence in the prediction. For instance, the counter may be configured to require, as a simple illustration, six out of eight predicted taken to confidently render a predicted taken. The actual numbers or ratios to fulfill the bias may differ, and given here as six of eight for mere illustration. Further, the progression of the counter is also modified to bias towards not taken prediction. For instance, the counter may be decremented at a faster rate (e.g., by two) than incremented (e.g., by one) for not taken predictions.

Figure 3:
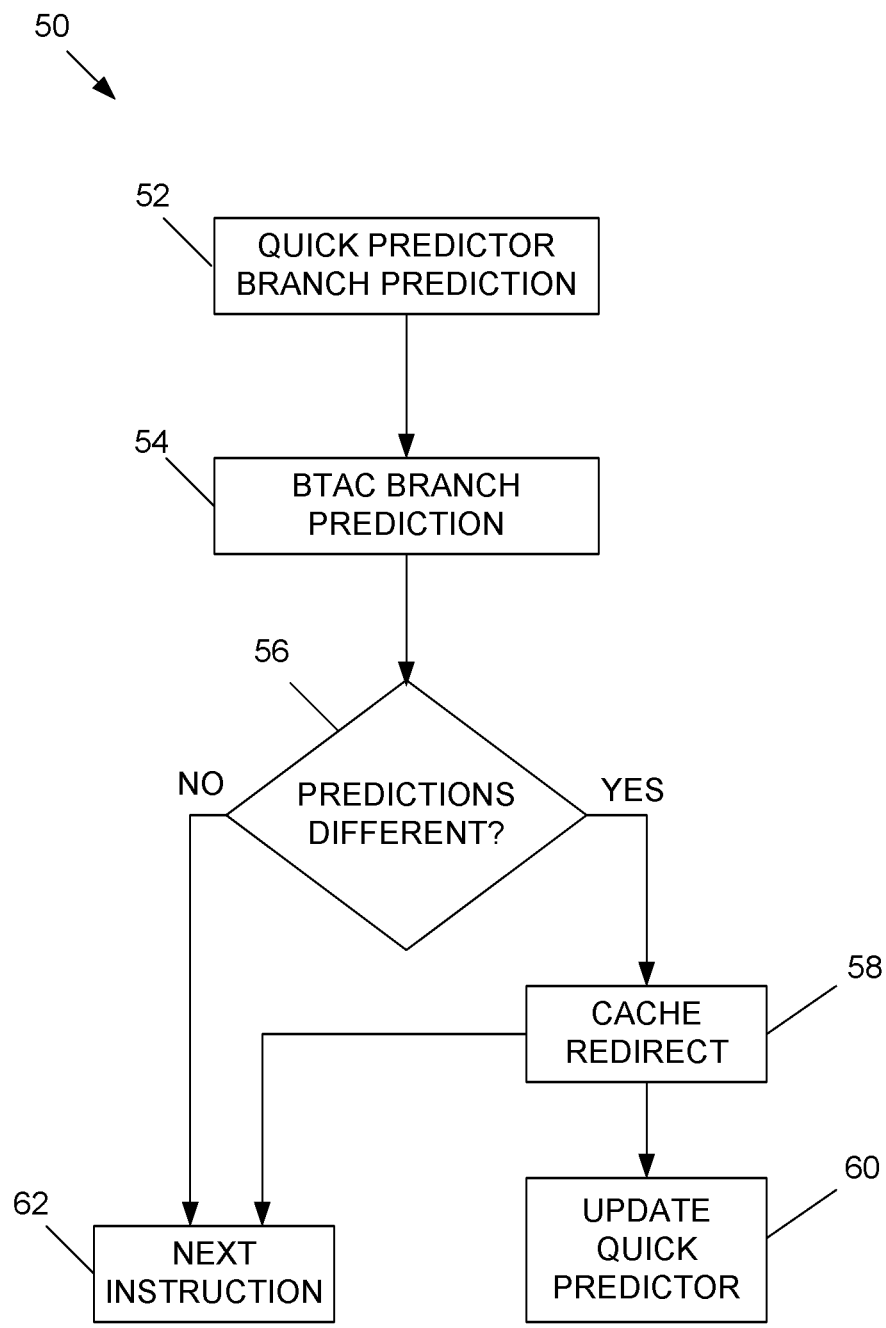
FIG. 3 is a flow diagram showing an embodiment of an example quick predictor override method.

Having described certain embodiments of a quick predictor override system, it should be appreciated that one embodiment of an example quick predictor override method, denoted as method 50 in FIG. 3, comprises the quick predictor 12 (FIG. 2A) providing a branch prediction (52), the BTAC 14 (FIG. 2) providing a branch prediction (54), and the BTAC determining if it disagrees with the branch prediction of the quick predictor (56). If so ("Yes" at 56), the BTAC 14 overrides the quick predictor 12 by providing an instruction cache redirect (58), updating the branch predictor table (60), and then the next instruction is fetched (62). If the BTAC 14 agrees with the quick predictor branch prediction ("No" at 56), the next instruction is fetched (62).

Figure 4:
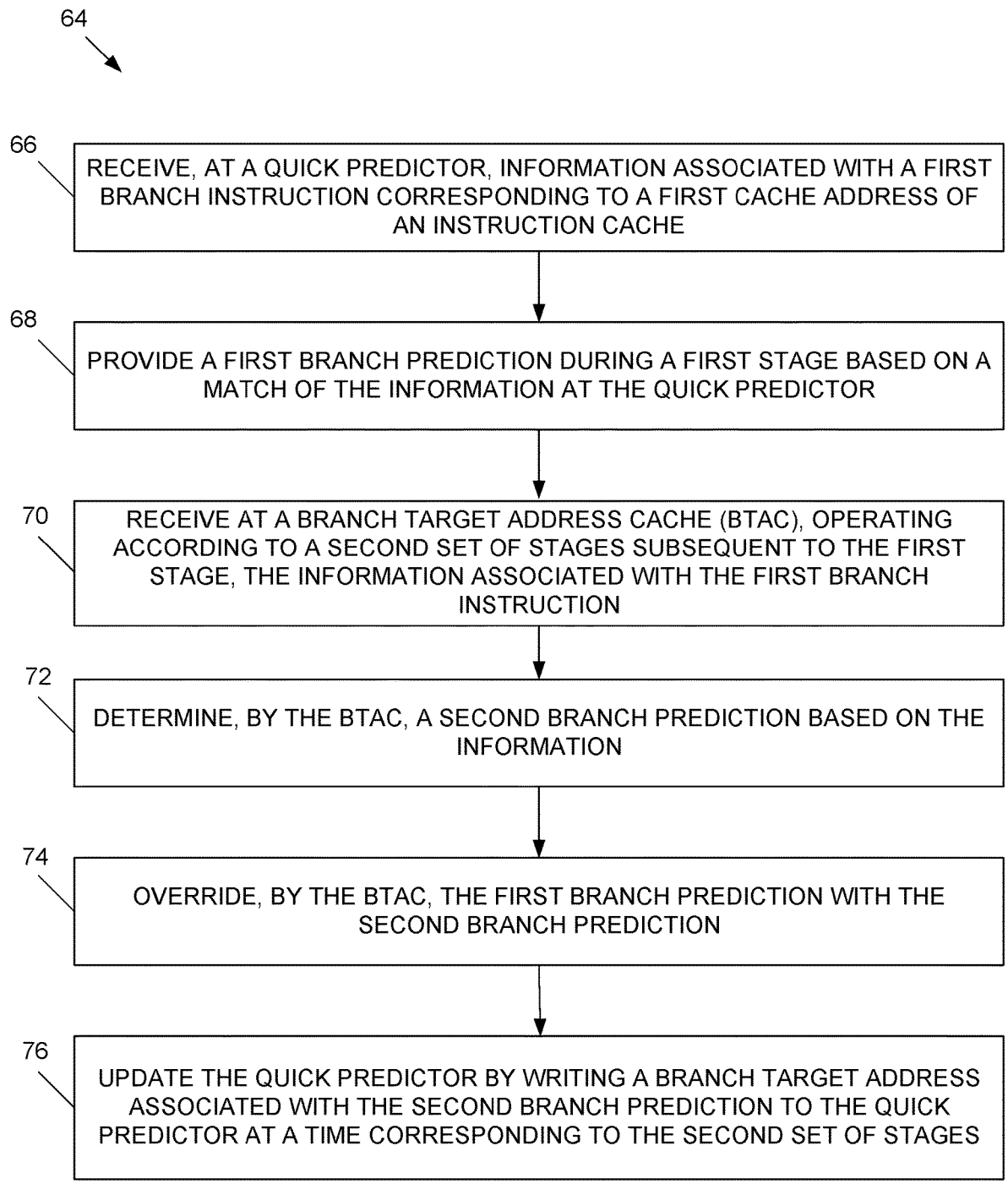
FIG. 4 is a flow diagram that shows an embodiment of another example quick predictor override method.

Having described certain embodiments of a quick predictor override system, it should be appreciated that one embodiment of another example quick predictor override method, denoted as method 64 in FIG. 4, comprises receiving, at a quick predictor, information associated with a first branch instruction corresponding to a first cache address of an instruction cache (66); providing a first branch prediction during a first stage based on a match of the information at the quick predictor (68); receiving at a branch target address cache (BTAC), operating according to a second set of stages subsequent to the first stage, the information associated with the first branch instruction (70); determining, by the BTAC, a second branch prediction based on the information (72); overriding, by the BTAC, the first branch prediction with the second branch prediction (74); and updating the quick predictor by writing a branch target address associated with the second branch prediction to the quick predictor at a time corresponding to (e.g., during) the second set of stages (76). The information referenced above for purposes of a match comprises at least a tag.

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not At least the following is claimed:

1. A microprocessor, comprising:
an instruction cache comprising programming instructions at a plurality of cache addresses;
a quick predictor configured to receive information associated with a first branch instruction corresponding to a first cache address of the instruction cache and, based on a match of the information at an entry of the quick predictor, output a first branch prediction comprising a first direction and a second cache address during a first clock cycle, the quick predictor configured to receive the information and output the first branch prediction entirely during a single clock cycle; and
a branch target address cache (BTAC) configured to receive the information associated with the first branch instruction and, based on a match of the information at an entry of the BTAC, determine a second branch prediction comprising a second direction and a third cache address, wherein based on a difference between the first branch prediction and the second branch prediction, the BTAC is configured to override the first branch prediction and update the quick predictor by writing the third cache address as a branch target address to the entry of the quick predictor, wherein the BTAC is configured to update the quick predictor two cycles after the first clock cycle, the BTAC configured to receive the information, override the first branch prediction, and update the quick predictor entirely during three consecutive clock cycles used by three operational stages of the BTAC to provide the second branch prediction based on the information, wherein the first clock cycle overlaps with a first of the three consecutive clock cycles.

2. The microprocessor of claim 1, wherein the quick predictor comprises a table with a first plurality of table entries having an n-way, set-associative organization, and the BTAC comprises a set of tables with a second plurality of table entries having an m-way, set-associative organization, the second plurality of table entries greater in quantity than the first plurality of table entries, and n and m greater than one.

3. The microprocessor of claim 2, wherein the quick predictor comprises a conditional branch predictor.

4. The microprocessor of claim 1, wherein the quick predictor comprises a zero taken penalty and the BTAC comprises a two-clock taken penalty.

5. The microprocessor of claim 1, wherein each of the quick predictor and the BTAC can perform a plurality of types of branch predictions.

6. The microprocessor of claim 1, wherein the information comprises at least a tag, and the quick predictor is configured to concurrently compare the tag of a current instruction fetch with tags of corresponding table entries of the quick predictor to determine the match.

7. The microprocessor of claim 1, wherein the quick predictor uses a local pattern history where branch prediction direction is biased not taken.

8. The microprocessor of claim 7, wherein the quick predictor comprises a conditional branch predictor and a counter that decrements differently than increments according to a bias.

9. The microprocessor of claim 8, wherein the counter comprises a three-bit counter.

10. The microprocessor of claim 1, wherein the first branch prediction is based on a local branch pattern and the second branch prediction is based on a global branch pattern.

11. The microprocessor of claim 1, wherein an update includes an update to the first direction.

12. The microprocessor of claim 1, wherein the BTAC is configured to override by providing a cache instruction fetch re-direct based on the third cache address.

13. The microprocessor of claim 1, wherein the quick predictor comprises a zero taken branch penalty.

14. A quick predictor override method, the method comprising:
receiving, at a quick predictor, information associated with a first branch instruction corresponding to a first cache address of an instruction cache;
outputting a first branch prediction comprising a first direction and a second cache address during a first clock cycle based on a match of the information at an entry of the quick predictor, the quick predictor configured to receive the information and output the first branch prediction entirely during a single clock cycle;
receiving at a branch target address cache (BTAC) the information associated with the first branch instruction;
determining, by the BTAC, a second branch prediction comprising a second direction and a third cache address based on a match of the information at an entry of the BTAC; and
based on a difference between the first branch prediction and the second branch prediction:
overriding, by the BTAC, the first branch prediction with the second branch prediction; and
updating, by the BTAC, the quick predictor by writing the third cache address as a branch target address to the entry of the quick predictor two cycles after the first clock cycle, the receiving at the BTAC, determining, overriding, and updating the BTAC performed entirely during three consecutive clock cycles used by three operational stages of the BTAC that are used to provide the second branch prediction based on the information, wherein the first clock cycle overlaps with a first of the three consecutive clock cycles.

15. The method of claim 14, wherein the information comprises at least a tag, and the quick predictor is configured to concurrently compare the tag of a current instruction fetch with tags of corresponding table entries of the quick predictor to determine the match.

16. The method of claim 14, wherein the first branch prediction is based on a local pattern history where branch prediction direction is biased not taken and the second branch prediction is based on a global pattern history.

17. The method of claim 16, wherein the quick predictor comprises a conditional branch predictor and a counter that decrements differently than increments according to a bias.

18. The method of claim 14, wherein the updating includes an update to the first direction.

19. The method of claim 14, wherein the updating includes providing a cache instruction fetch re-direct based on the third cache address.

20. The method of claim 14, wherein the quick predictor comprises a zero taken branch penalty.

* * * * *